United States Patent
Tsukitani

(10) Patent No.: US 10,013,155 B2
(45) Date of Patent: Jul. 3, 2018

(54) FOCUS SHIFT CONTROL APPARATUS

(71) Applicant: Takayuki Tsukitani, Tokyo (JP)

(72) Inventor: Takayuki Tsukitani, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 413 days.

(21) Appl. No.: 14/761,549

(22) PCT Filed: Feb. 8, 2013

(86) PCT No.: PCT/JP2013/053092
§ 371 (c)(1),
(2) Date: Jul. 16, 2015

(87) PCT Pub. No.: WO2014/122777
PCT Pub. Date: Aug. 14, 2014

(65) Prior Publication Data
US 2015/0363078 A1 Dec. 17, 2015

(51) Int. Cl.
*G06F 3/048* (2013.01)
*G06F 3/0484* (2013.01)
(Continued)

(52) U.S. Cl.
CPC ........ *G06F 3/04842* (2013.01); *G06F 3/0481* (2013.01); *G06F 3/0482* (2013.01); *G09G 5/08* (2013.01); *G09G 5/14* (2013.01); *G09G 5/363* (2013.01); *G09G 5/397* (2013.01); *G06F 9/4443* (2013.01); *G06F 9/451* (2018.02); *G09G 2354/00* (2013.01); *G09G 2370/08* (2013.01)

(58) Field of Classification Search
CPC .................................................. G06F 3/0481

USPC ......................................................... 715/802
See application file for complete search history.

(56) References Cited

U.S. PATENT DOCUMENTS 6,606,106 B1 * 8/2003 Mendenhall .......... G06F 9/4443
345/172
6,614,457 B1 * 9/2003 Sanada ................. G06F 3/0489
348/E5.105

(Continued)

FOREIGN PATENT DOCUMENTS

JP 2000-200129 A 7/2000
JP 2007-36526 A 2/2007
(Continued)

OTHER PUBLICATIONS https://www.sitepoint.com/community/t/focus-on-parent-window-after-closing-child-window/5459.*
https://web.archive.org/web/20120314210747/http://api.jquery.com/triggerhandler/.*

*Primary Examiner* — Matthew Ell
(74) *Attorney, Agent, or Firm* — Birch, Stewart, Kolasch & Birch, LLP

(57) ABSTRACT

A shift controller 113 of a focus management unit 110 decides whether the component designated by a focus position has a handler 131 when shifting a focus. As a result of the decision, if the component has the handler 131, the shift controller 113 shifts the focus in accordance with the processing described in the handler 131. Unless the component has the handler 131, the shift controller 113 decides whether it can shift the focus in accordance with a general rule 112a. As a result of the decision, it carries out control in a manner as to shift the focus if it can shift the focus, but not to shift the focus if it cannot shift it.

3 Claims, 5 Drawing Sheets

(51) Int. Cl.
   *G06F 3/0481*    (2013.01)
   *G09G 5/14*      (2006.01)
   *G09G 5/36*      (2006.01)
   *G09G 5/397*     (2006.01)
   *G06F 3/0482*    (2013.01)
   *G09G 5/08*      (2006.01)
   G06F 9/451       (2018.01)
   G06F 9/44        (2018.01)

(56) References Cited

U.S. PATENT DOCUMENTS

| | | | |
|---|---|---|---|
| 8,893,039 B2 * | 11/2014 | Kawashima | G06F 9/4443 |
| | | | 715/767 |
| 2004/0041837 A1 | 3/2004 | Yamaguchi et al. | |
| 2006/0288372 A1 | 12/2006 | Harada et al. | |
| 2007/0097269 A1 | 5/2007 | Tsukamoto | |
| 2007/0214426 A1 * | 9/2007 | Ruelle | G06F 3/0481 |
| | | | 715/767 |
| 2014/0108981 A1 * | 4/2014 | Payzer | G06F 3/0481 |
| | | | 715/767 |

FOREIGN PATENT DOCUMENTS

| | | |
|---|---|---|
| JP | 2008-97266 A | 4/2008 |
| JP | 2008-293410 A | 12/2008 |
| JP | 2010-39967 A | 2/2010 |
| WO | WO 03/025729 A1 | 3/2003 |
| WO | WO 2005/062605 A1 | 7/2005 |

* cited by examiner

FOCUS SHIFT CONTROL APPARATUS

TECHNICAL FIELD

The present invention relates to a focus shift control apparatus that carries out focus shift control when focusing on any one of the components on a screen displaying a plurality of components.

BACKGROUND ART

On a graphical user interface (GUI), selection of one of the components such as buttons arranged on the screen is the most basic operation. As for the selection of a component, there are a method of directly pointing at the component using a pointing device such as a mouse, and a method of selecting after shifting the focus to a desired component through an input device capable of indicating only the shift direction such as arrow keys or a dial. As for the method using the arrow keys or dial, it is important to carry out the focus shift control appropriately in conformity with the input from the input device.

However, as the number of the components on the GUI increases or the arrangement of the components becomes complicated, the setting of the focus shift control becomes troublesome. Thus, some methods have been proposed for improving efficiency of constructing the GUI including the setting of the focus shift control. For example, Patent Document 1 discloses a method of improving the efficiency of constructing the GUI by making rules for the number and arrangement of the components and for the order of the focus shift in advance and by generating the GUI automatically from them. In addition, Patent Document 2 discloses a method of shifting a focus by providing the components on the screen with an attribute indicating whether they can accept the focus or not, and by skipping the components that cannot accept the focus. Furthermore, Patent Document 3 is one that tries to provide a GUI which is easy to use by shifting the focus in accordance with the focus shift information contained in an event notice from the outside.

PRIOR ART DOCUMENT

Patent Document

Patent Document 1: Japanese Patent Laid-Open No. 2010-39967.
Patent Document 2: Japanese Patent Laid-Open No. 2000-200129.
Patent Document 3]: Japanese Patent Laid-Open No. 2007-36526.

DISCLOSURE OF THE INVENTION

Problems to be Solved by the Invention

However, since the technique described in the Patent Document 1 automatically generates the GUI after determining the rule of the focus shift control, there is no guarantee that a GUI with desired design is always created. In addition, the technique described in the Patent Document 2 does not implement the focus shift between the components arranged complexly except that it skips the components that cannot accept the focus. Furthermore, the technique described in the Patent Document 3 is one that aims to improve the operability mainly, but does not refer to the efficiency improvement in the setting of the focus shift control.

The present invention is implemented to solve the foregoing problems. Therefore it is an object of the present invention to provide a focus shift control apparatus capable of realizing efficient focus shift setting even in the focus shift setting for a GUI that has already been designed.

Means for Solving the Problems

A focus shift control apparatus in accordance with the present invention is a focus shift control apparatus which carries out shift control of a focus when setting the focus for operating one of the components on a GUI screen displaying a plurality of components, and which comprises: a focus position that includes a default focus position and designates a component having the focus at present; a component disappearance rule that is to be applied to the entire GUI screen to determine a component to which the focus is to be shifted next, when the component having the focus disappears; and a shift controller that decides whether the component stored in the focus position has a handler for determining the component to which the focus is to be shifted next when the component having the focus disappears and the focus shift is to be made, that shifts, if the component has the handler, the focus in accordance with the processing described in the handler, that decides, unless the component has the handler, whether the shift controller can shift the focus in accordance with the component disappearance rule, and that shifts the focus when it can shift the focus, but shifts the focus to the default focus position when it cannot shift the focus.

Advantages of the Invention

The focus shift control apparatus in accordance with the present invention can realize the efficient focus shift setting even as to the focus shift setting for the GUI that has already been designed and can deal with the case where the component having the focus disappears.

BEST MODE FOR CARRYING OUT THE INVENTION

The best mode for carrying out the invention will now be described with reference to the accompanying drawings to explain the present invention in more detail.

Embodiment 1

Figure 1:
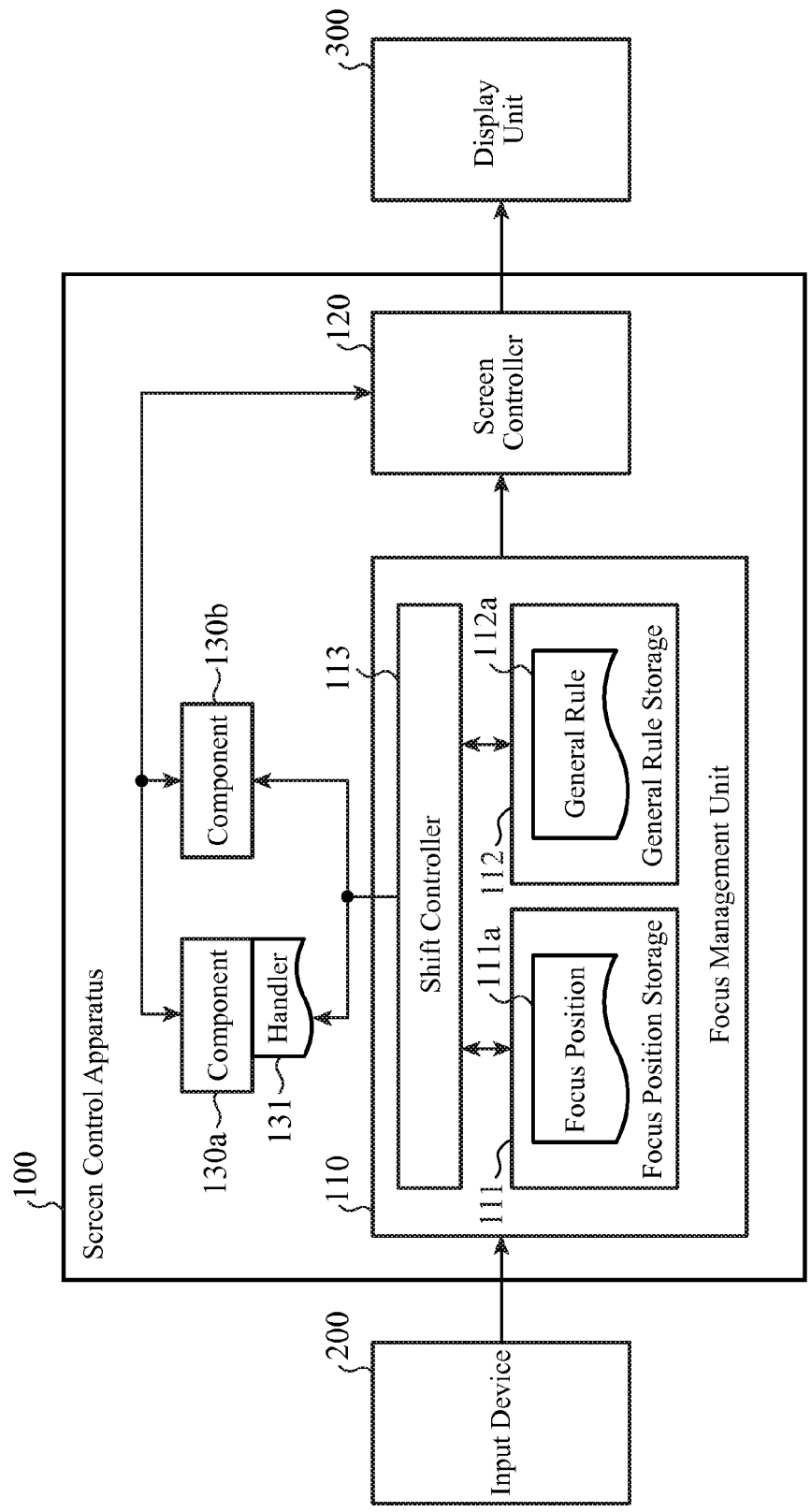
FIG. 1 is a block diagram showing a configuration of a screen control apparatus to which a focus shift control apparatus in accordance with the present invention is applied.

FIG. 1 is a block diagram showing a configuration in the case where the focus shift control apparatus of the present embodiment is applied to a screen control apparatus. The screen control apparatus 100 comprises a focus management unit 110, a screen controller 120, and components 130a and 130b. In addition, the screen control apparatus 100 is connected to an input device 200 and a display unit 300.

The input device 200 is a device that can designate only a shift direction such as arrow keys or a dial. As for the arrow keys, for example, although there are many which can input four directions of up and down, left and right, the input device here may be one that can input any directions. The screen control apparatus 100 displays the components 130a and 130b to be displayed on a screen on the display unit 300. Here, the term "component" refers to all the elements that can be arranged on the screen such as a button, an image and a text field. Although the components are divided into focusable components (such as a button and a text field that accept input from a user) and unfocusable components (such as a background image and an ornamental component that do not accept input from a user), to simplify the following description, it will be made on the assumption that only focusable components are arranged. Incidentally, it is further assumed that the individual components have their own IDs to be uniquely identified. Although FIG. 1 shows only two components 130a and 130b, the number of them are not limited as long as they are plural.

The focus management unit 110, which receives the input from the input device 200 and carries out focus shift control, comprises a focus position storage 111, a general rule storage 112, and a shift controller 113. The focus position storage 111 is a storage that stores a focus position 111a indicating the component having the focus at present by the ID of the component. The general rule storage 112 is a storage that stores a general rule 112a which is a focus shift rule applied to the entire screen collectively. As a rule that can be set to the general rule 112a, there are rules applicable to the whole collectively such as those that shift in accordance with the positional relationships between absolute coordinates of the components, that shift in accordance with the overlapping order of the components, and that shift in the order designated in advance. For example, in an environment having four direction input of up and down, left and right, when a rule for shifting the component in accordance with the positional relationships between the absolute coordinates of the component is set as the general rule 112a, the focus management unit 110 decides the component closest in the direction input from the input device 200 when seen from the component indicated by the focus position 111a, brings the focus on it, and stores the ID of the component in the focus position 111a.

In addition, a handler 131 capable of describing any processing can be given to the individual components (component 130a and component 130b in FIG. 1) so as to enable setting a rule about the focus shift. Although a rule applicable only to a particular component such as designating a particular component or designating the closest component can be set in the handler 131, for example, the rule can be one that shifts the focus at random or expands a general rule.

The shift controller 113 in the focus management unit 110 is a controller that receives the input for shifting the focus from the input device 200, decides whether the component designated by the focus position 111a has the handler 131 for determining the component to which the focus is to be shifted next or not, and shifts the focus in accordance with the processing described in the handler 131 when it has the handler 131, and that decides, unless it has the handler 131, whether the focus is shiftable in accordance with the general rule 112a, shifts the focus when shiftable, but does not shift the focus when unshiftable.

In addition, the screen controller 120, which generates screen data for displaying the individual components using the components 130a and 130b, sends the display screen data generated to the display unit 300. The display unit 300 is one that displays the screen in response to the display screen data.

Figure 2:
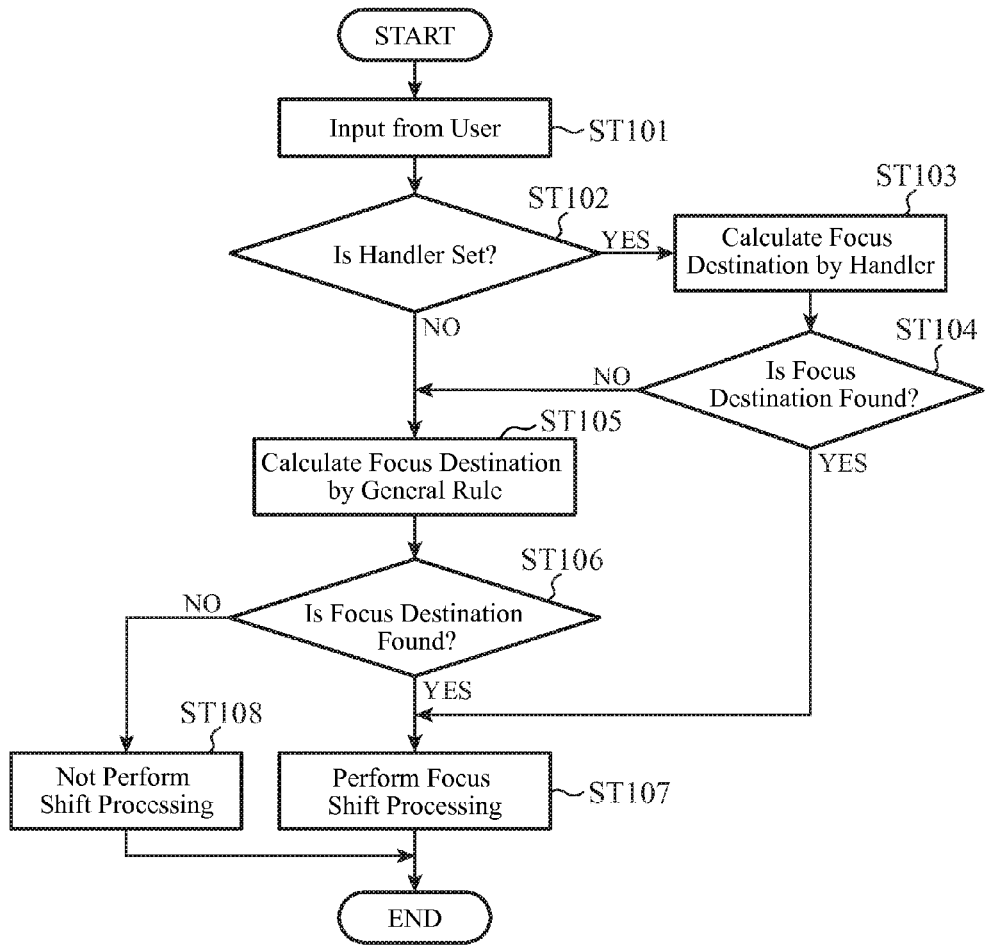
FIG. 2 is a flowchart showing the operation of a focus shift control apparatus of an embodiment 1 in accordance with the present invention.

Next, the operation of the focus shift control apparatus of the embodiment 1 will be described. FIG. 2 is a flowchart showing the operation thereof.

When a user provides input for shifting a focus through the input device 200 (step ST101), the shift controller 113 in the focus management unit 110 checks whether or not the handler 131 is set in the component set in the focus position 111a at the time (step ST102). Here, unless the handler 131 is set, although the shift controller 113 applies the general rule 112a (step ST105), if the handler 131 is set, it executes the focus shift calculation according to the rule described in the handler 131 (step ST103). As a result, when the shift controller 113 finds a focus destination (step ST104), although it simply carries out the focus shift (step ST107), unless it cannot find it, it executes the focus shift calculation according to the general rule 112a (step ST105). Next, if the shift controller 113 finds the focus destination in the focus shift calculation according to the general rule 112a at step ST105 (step ST106), it shifts the focus (step ST107). Finally, if it cannot find the focus destination (step ST106), it does not execute the focus shift processing (step ST108).

Figure 3:
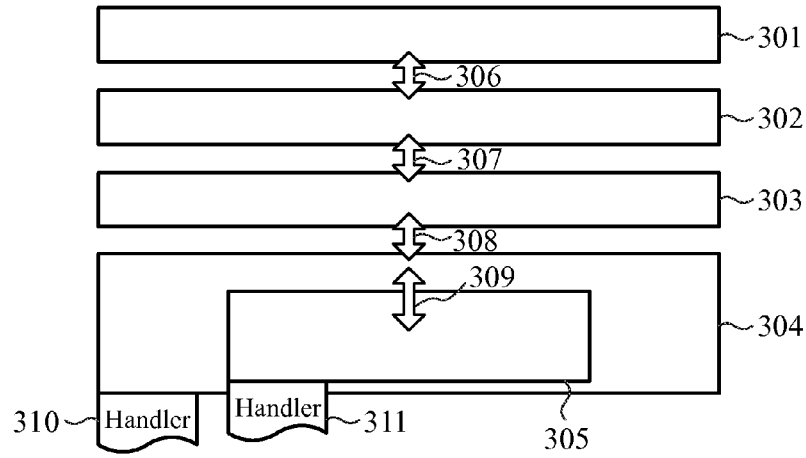
FIG. 3 is a diagram illustrating an example of a component arrangement on the focus shift control apparatus of the embodiment 1 in accordance with the present invention.

Here, consider a case where a GUI developer, for example, has to set the shift of a focus through the up and down keys such as indicated by arrows 306, 307, 308 and 309 when the components are arrange as shown in FIG. 3. As the general rule 112a, a rule is set for shifting the focus in conformity with the positional relationships between the components. Thus, if the up key is pressed while the component 302 has the focus, for example, the focus shifts to the component 301. On the contrary, if the down key is pressed, the focus shifts to the component 303. Here, for design reasons, the component 305 is placed on the component 304. Thus, although the general rule 112a enables shift along the arrows 306, 307, and 308, it does not enable shift along the arrow 309. In view of this, the component 304 is provided with a handler 310 for shifting the focus to the component 305 with the down key, and the component 305 is provided with a handler 311 for shifting the focus to the component 304 with the up key to carry out the desired processing.

In this way, depending on whether the handler 131 is set or not, and whether the focus destination can be obtained by the handler 131 or not, the embodiment 1 can use the focus shift according to the general rule 112a and the focus shift by the handler 131 for different purposes. Accordingly, it can set desired operation such as setting roughly by the general rule 112a and setting detailed exceptional points by the handler 131 without taking much time. In addition, even if the screen design is changed, it can deal with it by only adjusting the handler 131 at the points of change without altering the general rule 112a, thereby making it easier to handle the component arrangement. Furthermore, even if a fault occurs about the focus shift during program preparation, locating and correction of the failure becomes easier.

As described above, according to the focus shift control apparatus of the embodiment 1, it carries out the shift control of the focus when setting the focus for operating one of the components on the GUI screen displaying a plurality of components, and comprises: the general rule that is to be applied to the entire GUI screen to determine the component to which the focus is to be shifted next, when the input for shifting the focus is provided; the focus position that designates the component having the focus at present; and the shift controller that receives the input for shifting the focus, and decides whether the component designated by the focus position has the handler for determining the component to which the focus is to be shifted next, and that carries out control in a manner that the shift controller shifts, if the component has the handler, the focus in accordance with the processing described in the handler, decides, unless the component has the handler, whether the shift controller can shift the focus in accordance with the general rule, and shifts the focus when it can shift the focus, but does not shift the focus when it cannot shift the focus. Accordingly, it can realize efficient focus shift setting even for the focus shift setting for the GUI that has already been designed.

Embodiment 2

Although the embodiment 1 relates to the focus shift through the input device 200, setting of a focus shift method when a component having the focus disappears will be described as an embodiment 2. Incidentally, since the configuration of the focus shift control apparatus of the embodiment 2 is the same as that of the embodiment 1 in terms of the drawing, it will be described with reference to FIG. 1.

As for the term "disappearance of a component having the focus", when a state in the apparatus alters owing to a factor other than a direct operation of a user, such as a communication condition alters in a smartphone, and an operation state of a car alters on an onboard apparatus, the term refers to a situation in which the component itself disappears from the screen because the component having the focus is a component that is effective only before the change of the state, or because the component becomes incapable of accepting the focus. In addition, when selecting a particular button causes the button itself to become incapable of accepting the focus or to disappear, the component having the focus is considered to disappear.

Thus, in the embodiment 2, as the general rule 112a of the focus management unit 110, the general rule storage 112 stores a component disappearance rule for the case where the component having the focus disappears. As the component disappearance rule that can be set in the general rule 112a, there is, for example, a rule that can be set collectively for the whole such as a rule of shifting the focus to the closest focusable component, and a rule of shifting the focus to one component this side in the order of an overlap.

Furthermore, the individual components 130a and 130b are provided with the focus shift rule at the time when the components themselves have the focus as the handler 131 and disappear. To the handler 131, for example, it is possible to set a component disappearance rule applicable to only a specific component such as designating a specific component or designating the same type of components. Furthermore, the component disappearance rule can be an extension of the general rule.

In addition, the focus management unit 110 can have a default focus position set in advance so that even if the handler for each component or the component disappearance rule cannot find an appropriate focus destination, the focus management unit 110 can set the focus at the default focus position. Incidentally, it is assume here that the default focus position is retained in the focus position storage 111 as the focus position 111a.

Next, the operation of the embodiment 2 will be described. Incidentally, since the operation is the same as that of the embodiment 1 except for the operation at the time when the component having the focus disappears, the operation different from that of the embodiment 1 will be described mainly.

Figure 4:
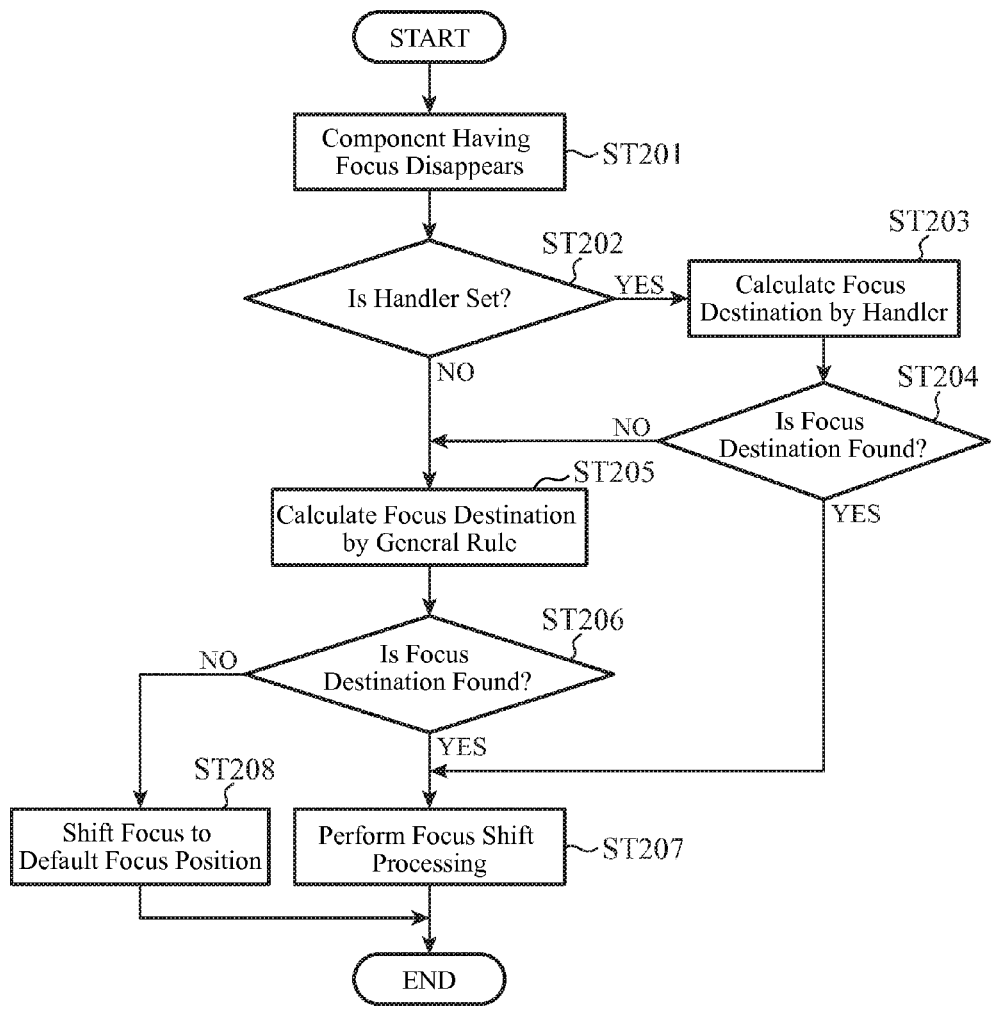
FIG. 4 is a flowchart showing the operation of a focus shift control apparatus of an embodiment 2 in accordance with the present invention.

FIG. 4 shows a flowchart of the operation. First, if the component having the focus disappears because of a certain factor (step ST201), the shift controller 113 of the focus management unit 110 checks whether or not the handler 131 is set at the component having the focus at that time (step ST202). Here, unless the handler 131 is set, the general rule 112a is applied (step ST205), but if the handler 131 is set, the shift controller 113 executes the calculation of the focus shift according to the rule described in the handler 131 (step ST203). As a result, if it finds the focus destination (step ST204), it simply carries out the focus shift (step ST207). However, if it does not find the focus destination, it executes the focus shift calculation according to the general rule 112a (step ST205). Next, when it finds the focus by the focus shift calculation according to the general rule 112a at step ST205 (step ST206), it shifts the focus (step ST207). If it cannot find the focus destination to the last, it shifts the focus to the default focus position (step ST208).

Figure 5:
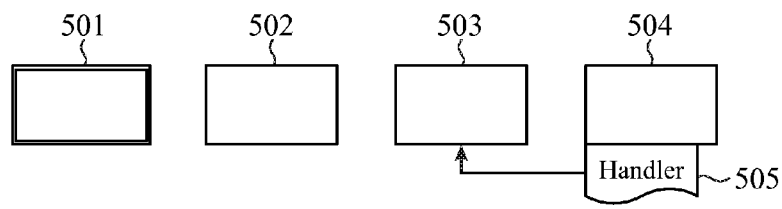
FIG. 5 is a diagram illustrating an example of a component arrangement on the focus shift control apparatus of the embodiment 2 in accordance with the present invention.

Here, consider a case where four focusable components are arranged in a line as shown in FIG. 5, for example. As the general rule 112a, if the component having the focus disappears, the component disappearance rule is set which shifts the focus to the first right component on the screen. In addition, although the focus shifts to the component 503 if the component 502 disappears in the state of having the focus, since the default focus position is the leftmost component 501, if the rightmost component 504 disappears in the state of having the focus, the focus shifts to the leftmost component 501. Here, suppose that when the component 504 disappears in the state of having the focus, a developer must shifts the focus not to the leftmost component 501, but to the first left component 503, then the developer can provide the desired focus shift by specifying the processing of shifting the focus to the component 503 in the handler 505.

In this way, in addition to the advantages described in the embodiment 1, the embodiment 2 can deal with the case where the component having the focus disappears. Specifically, depending on whether the handler 131 is set or not, or whether the focus destination can be acquired by the handler 131 or not, it can use the focus shift according to the general rule 112a and the focus shift by the handler 131 for different purposes, thereby being able to set the desired operation without taking much time. In addition, even when the screen design is changed, it can facilitate handling the component arrangement such as dealing with the change by only adjusting the handler 131 at the location of the change without changing the general rule 112a. Furthermore, even if a fault as to the focus shift occurs during the program preparation, it can locate the fault and repair it more easily.

Incidentally, as for the setting of the focus shift control for the input of the user described in the embodiment 1, and the setting of the focus shift control when the focus component disappears described in the embodiment 2, they can be used at the same time, and enable setting all the cases of the focus shift efficiently.

As described above, according to the focus shift control apparatus of the embodiment 2, it is configured in such a manner as to comprise the component disappearance rule that is to be applied to the entire GUI screen to determine the component to which the focus is to be shifted next, when the component having the focus disappears; the focus position that includes a default focus position; and the shift controller that decides whether the component stored in the focus position has a handler for determining the component to which the focus is to be shifted next when the component having the focus disappears and the focus shift is to be made, shifts, if the component has the handler, the focus in accordance with the processing described in the handler, decides, unless the component has the handler, whether the shift controller can shift the focus in accordance with the component disappearance rule, and shifts the focus when it can shift the focus, but shifts the focus to the default focus position when it cannot shift the focus. Accordingly, in addition to the advantages of the embodiment 1, the embodiment 2 can cope with the case where the component having the focus disappears.

Embodiment 3

Although the embodiment 1 and embodiment 2 are described by way of example in which the individual components are simply arranged on the screen, a GUI often manages the components hierarchically by grouping them. For example, there can be a state in which the components on the screen are grouped according to the connotation or each step of the operation, and are enclosed by lines or sorted according to colors, or smaller groups are further set within a group. Thus, in the embodiment 3, a configuration will be described which sets a general rule for each hierarchical level of the groups. Incidentally, since the configuration of the focus shift control apparatus of the embodiment 3 is the same as that of the embodiment 1 in terms of the drawing, it will be described with reference to FIG. 1.

The embodiment 3 is configured in such a manner that when the individual components on the GUI screen are managed hierarchically, it has an intra-hierarchical level shift rule for determining the component, to which the focus is to be shifted next in response to the input from the user, for each hierarchical level as the general rule 112a, and when it cannot shift the focus in some hierarchical level, the shift controller 113 shifts the focus using the intra-hierarchical level shift rule in a one-rank higher hierarchical level.

Figure 6:
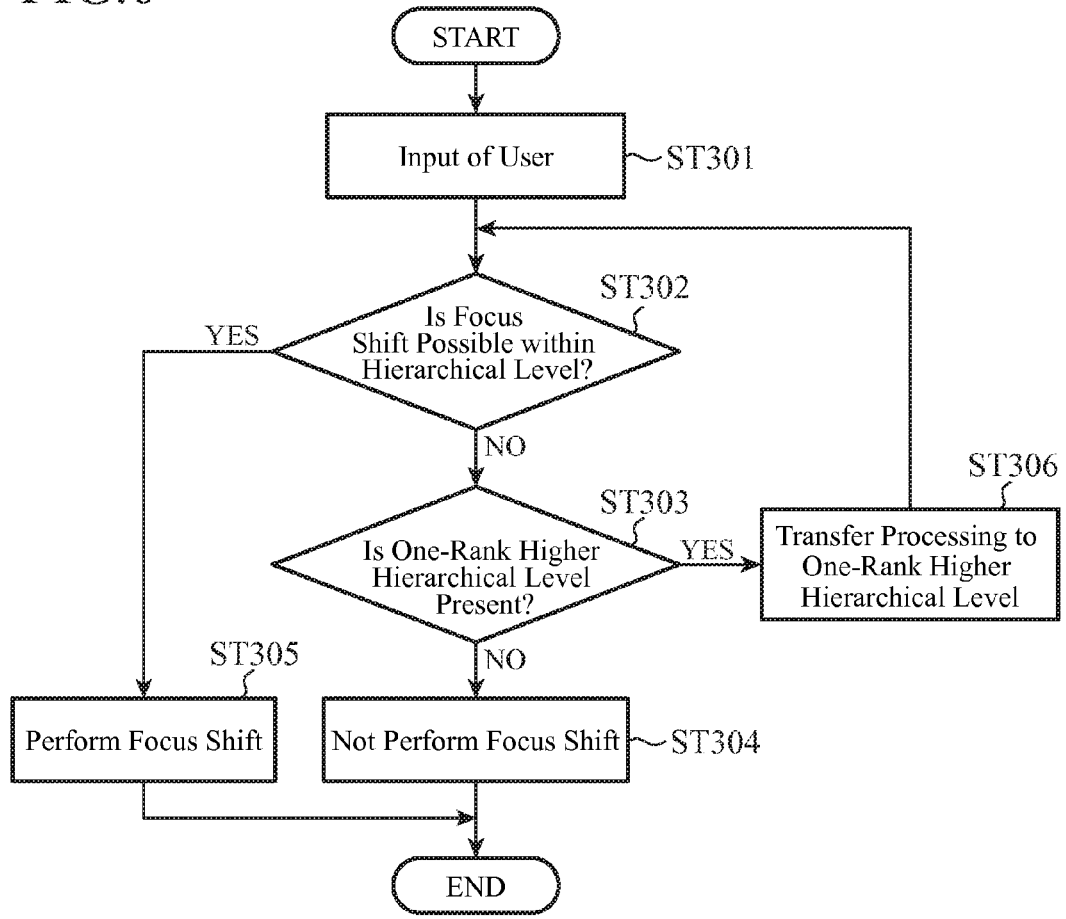
FIG. 6 is a flowchart showing the operation of a focus shift control apparatus of an embodiment 3 in accordance with the present invention.

Next, the operation of the embodiment 3 will be described. FIG. 6 shows a flowchart of the operation. First, when input is provided by a user (step ST301), the shift controller 113 of the focus management unit 110 decides whether it can shift the focus within the hierarchical level or not in the same method as the embodiment 1 (step ST302). When the focus is shiftable, the shift controller 113 simply executes the focus shift (step ST305), but if the focus is unshiftable, it decides whether a one-rank higher hierarchical level is present or not (step ST303). If it is present, the shift controller 113 decides whether it can shift the focus within the one-rank higher hierarchical level or not (step ST306), and if it is not present, the shift controller 113 does not shift the focus (step ST304).

Figure 7:
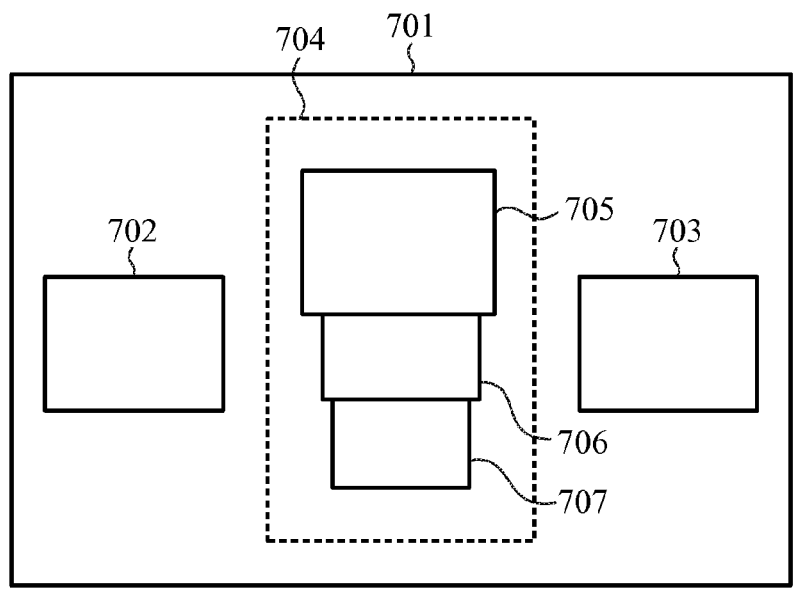
FIG. 7 is a diagram illustrating an example of a component arrangement on the focus shift control apparatus of the embodiment 3 in accordance with the present invention.

Here, as shown in FIG. 7, for example, assume that in a state where a component group 704 is placed within the screen 701, a focus shift rule according to the positional relationships between the components is set for the entire screen, and a shift rule according to an overlap order is set within the internal group 704 as the intra-hierarchical level shift rule. At this time, it is set in such a manner that according to the rule within the internal group 704, pushing the left key will cause the focus to shift to the one component this side of the current component (for example, from the component 706 to the component 705), and pushing the right key will cause the focus to shift to the one component back side of the current component (for example, from the component 706 to the component 707). In this state, that is, in the state where the focus is placed on a component within the internal group 704, when the left key is pushed, the focus shifts to the one component this side of the current component. However, when pushing the left key in the state where the focus is placed at the front component 705, there is no component to which the focus is to further shift within the group 704. In this case, the shift controller 113 transfers the event that the left key is pressed to the screen 701 which is the one-rank higher hierarchical level. As a result, the focus shift according to the positional relationships between the components, which is the general rule 112a of the screen 701, is applied so that the focus is shifted to the left component 702 placed on the left side of the internal group 704. Thus, according to the configuration, when pushing the left key consecutively in the state where the focus is placed in the component 703, the focus shifts in the order of the component 707, component 706, component 705, and component 702. In contrast, when pushing the right key consecutively in the state where the focus is placed in the component 702, the focus shifts in the order of the component 705, component 706, component 707, and component 703.

As for the handler 131 of each component at this time, it can designate the same processing as in the embodiment 1. In addition, the handler 131 can also have the processing of not to transfer the processing to the higher hierarchical level even if there is no focus destination within the group, or can have the processing for shifting the focus across the hierarchical levels.

In this way, setting the general rule 112a for each hierarchical level, the embodiment 3 can set complicated rules using only the general rule 112a. Here, the general rule 112a may differ for each hierarchical level, or the same rule may be set for all. Furthermore, using the handler 131 enables designating the focus shift beyond the hierarchical structure.

As described above, according to the focus shift control apparatus of the embodiment 3, it comprises the intra-hierarchical level shift rule that determines for individual hierarchical levels the component to which the focus is to be shifted next in response to the input for shifting the focus when the individual components on the GUI screen is hierarchically managed, wherein the shift controller, when it cannot carry out the focus shift in some hierarchical level, shifts the focus using the intra-hierarchical level shift rule in a one-rank higher hierarchical level. By setting the intra-hierarchical level shift rule in this way for each hierarchical level of the components, it can carry out even the complicated focus shift processing without taking much time. In addition, if an alteration occurs in the screen design, as long as the alteration remains within the group, the embodiment 3 can deal with it only by altering the rule setting within the group, thereby being able to facilitate the correction. Furthermore, even if a fault relating to the focus shift occurs during the program preparation, it can locate and correct the fault efficiently by searching for the cause of the fault for each hierarchical level.

Embodiment 4

Although the embodiment 3 is described by way of example which manages the components hierarchically as to the focus shift for the input of a user, a rule when the component having the focus disappears can be set for each hierarchical level as well. Specifically, the embodiment 4 is one that sets the intra-hierarchical level shift rule described in the embodiment 3 in the configuration of the embodiment 2. In addition, since the configuration of the focus shift control apparatus of the embodiment 4 is the same as that of the embodiment 1 in terms of the drawing, it will be described with reference to FIG. 1.

Figure 8:
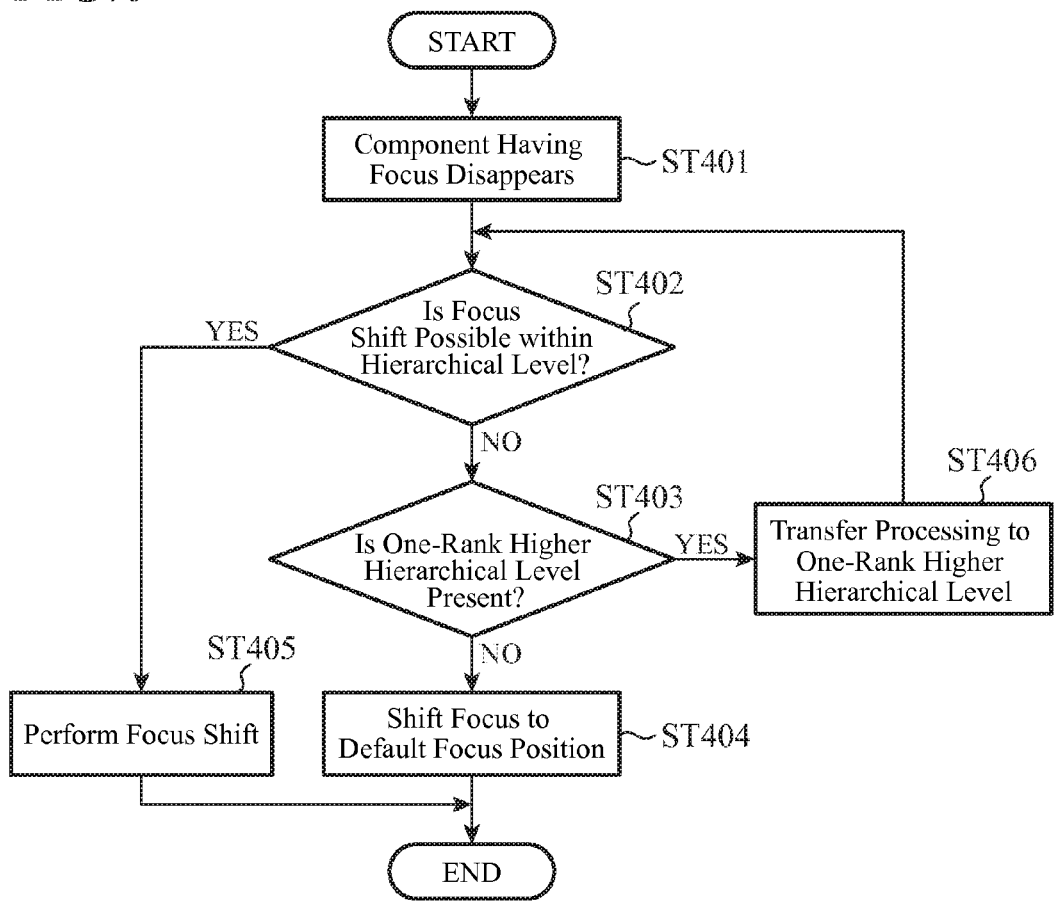
FIG. 8 is a flowchart showing the operation of a focus shift control apparatus of an embodiment 4 in accordance with the present invention.

Next, the operation of the embodiment 4 will be described. FIG. 8 shows a flowchart of the operation. First, if the component having the focus disappears (step ST401), the shift controller 113 decides whether it can shift the focus within the hierarchical level by the same method as that of the embodiment 2 (step ST402). If the focus is shiftable, the shift controller 113 simply executes the focus shift (step ST405), and if the focus is not shiftable, the shift controller 113 decides whether a one-rank higher hierarchical level is present or not (step ST403). When it is present, the shift controller 113 decides whether the focus is shiftable within the one-rank higher hierarchical level or not (step ST406). If the one-rank higher hierarchical level is not present at step ST403, the shift controller 113 shifts the focus to the default focus position (step ST404). Incidentally, it is assumed at least in the highest hierarchical level that a component with which the default focus position does not disappear is determined in advance.

Figure 9:
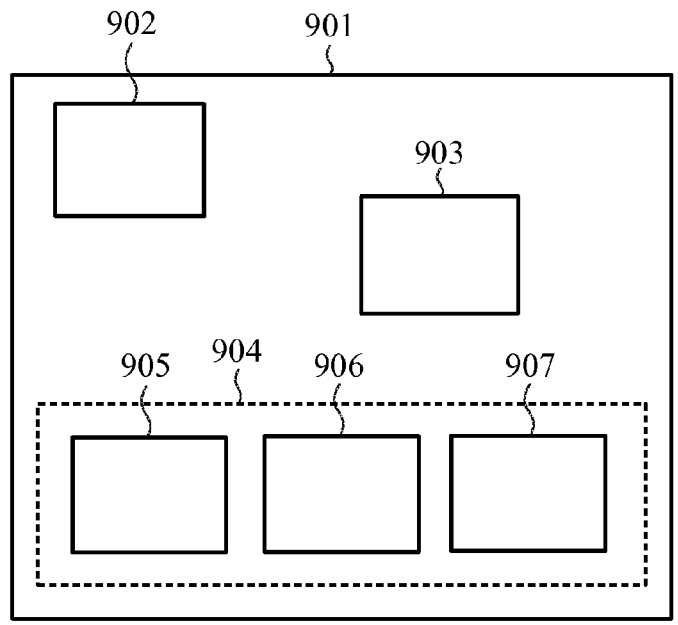
FIG. 9 is a diagram illustrating an example of a component arrangement on the focus shift control apparatus of the embodiment 4 in accordance with the present invention.

Here, as shown in FIG. 9, for example, assume that in a state where an internal group 904 is placed in the screen 901, the screen 901 has the general rule 112a (intra-hierarchical level shift rule) which shifts the focus to the closest component if the component having the focus disappears, and the internal group 904 has a rule which shifts the focus to the first left component. Furthermore, it is assumed that the default focus position of the group 904 is the component 905, and the default focus position of the screen 901 is the component 902. In this state, if the component 907 among the components within the internal group 904 disappears in the state of having the focus, the shift controller 113 can shift the focus to the component 906 on the left side. However, if the component 905 disappears while it has the focus, there is no focus destination within the group because the component 905 does not have a component on the left side, and the component 905 itself is the default focus position. In this case, however, the shift controller 113 transfers the event that the left key is pressed to the screen 901 which is the one-rank higher hierarchical level. As a result, the general rule 112a (intra-hierarchical level shift rule) of the screen 901 is applied, and the focus is shifted to the component 903 closest when seen from the internal group 904.

At this time, the handler 131 for each component can prescribe the same processing as that of the embodiment 2, and can have the processing for shifting the focus across the hierarchical levels or the processing that changes the transfer destination when the focus destination is not present within the group.

As described above, according to the focus shift control apparatus of the embodiment 4, when the individual components on the GUI screen is hierarchically managed, the focus shift control apparatus is configured in such a manner that it comprises for the individual hierarchical levels the intra-hierarchical level shift rule that determines the component to which the focus is to be shifted next in response to the input for shifting the focus, and that the shift controller, when it cannot carry out the focus shift in some intra-hierarchical level as a result of the control in the embodiment 2, shifts the focus using the intra-hierarchical level shift rule in a one-rank higher hierarchical level. By thus setting the general rule for each hierarchical level of the components, it can carry out even the complicated focus shift processing without taking much time. In addition, even if an alteration occurs in the screen design, as long as the alteration remains within the group, the embodiment 4 can deal with it by only altering the rule setting within the group, thereby being able to facilitate the correction. Furthermore, even if a fault relating to the focus shift occurs during the program preparation, it can locate and correct the fault efficiently by searching for the cause of the fault for each hierarchical level.

Incidentally, as for the focus shift control setting for the input of the user described in the embodiment 3, and the focus shift control setting when the focus component disappears described in the embodiment 4, they can be used at the same time, and all the cases of the focus shift can be set efficiently.

Incidentally, it is to be understood that a free combination of the individual embodiments, variations of any components of the individual embodiments or removal of any components of the individual embodiments is possible within the scope of the present invention.

INDUSTRIAL APPLICABILITY

As described above, a focus shift control apparatus in accordance with the present invention relates to a configuration for the shift control of shifting a focus to one of the components on a GUI screen on which a plurality of components are placed, and is suitable for an application to a screen control apparatus for controlling a GUI screen.

DESCRIPTION OF REFERENCE SYMBOLS 100 screen control apparatus; 110 focus management unit; 111 focus position storage; 111a focus position; 112 general rule storage; 112a general rule; 113 shift controller; 120 screen controller; 130a, 130b component; 131 handler; 200 input device; 300 display unit.

What is claimed is:

1. A focus shift control apparatus that carries out shift control of a focus when setting the focus for operating one of components on a GUI screen displaying a plurality of components, the focus shift control apparatus comprising:
at least one memory that stores:
a focus position that includes a default focus position and designates a component having the focus at present; and
a component disappearance rule that is to be applied to the entire GUI screen to determine a component to which the focus is to be shifted next, when the component having the focus disappears; and a processor configured as:
a shift controller that decides whether the component stored in the focus position has a handler for determining the component to which the focus is to be shifted next when the component having the focus disappears and the focus shift is to be made, that shifts, if the component has the handler, the focus in accordance with the processing described in the handler, that decides, unless the component has the handler, whether the shift controller can shift the focus in accordance with the component disappearance rule, and that shifts the focus when it can shift the focus, but shifts the focus to the default focus position when it cannot shift the focus.

2. The focus shift control apparatus according to claim 1, wherein the memory is configured to further store a general rule that is to be applied to an entire GUI screen to determine a component to which the focus is to be shifted next, when input for shifting a focus is provided, wherein
the shift controller receives the input for shifting the focus to decide whether the component designated by the focus position has a handler for determining the component to which the focus is to be shifted next, and carries out control in a manner that the shift controller shifts, if the component has the handler, the focus in accordance with the processing described in the handler, decides, unless the component has the handler, whether the shift controller can shift the focus in accordance with the general rule, and shifts the focus when it can shift the focus, but does not shift the focus when it cannot shift the focus.

3. The focus shift control apparatus according to claim 1, wherein, when the individual components on the GUI screen is hierarchically managed, the memory is configured to further store an intra-hierarchical level shift rule that determines a component, to which the focus is to be shifted next in response to the input for shifting the focus, for individual hierarchical levels, wherein
the shift controller, when it cannot carry out the focus shift in some intra-hierarchical level as a result of the control described in claim 1, shifts the focus using the intra-hierarchical level shift rule in a one-rank higher hierarchical level.

* * * * *